United States Patent
Ollila et al.

(10) Patent No.: US 10,726,257 B2
(45) Date of Patent: *Jul. 28, 2020

(54) GAZE-TRACKING SYSTEM AND METHOD OF TRACKING USER'S GAZE

(71) Applicant: Varjo Technologies Oy, Helsinki (FI)

(72) Inventors: Mikko Ollila, Tampere (FI); Klaus Melakari, Oulu (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 107 days.

This patent is subject to a terminal disclaimer.

(21) Appl. No.: 15/886,040

(22) Filed: Feb. 1, 2018

(65) Prior Publication Data

US 2018/0157910 A1 Jun. 7, 2018

Related U.S. Application Data

(63) Continuation-in-part of application No. 15/648,886, filed on Jul. 13, 2017, now abandoned, which is a
(Continued)

(51) Int. Cl.
| | |
|---|---|
| *G06K 9/00* | (2006.01) |
| *G06K 9/20* | (2006.01) |
| *G02B 27/00* | (2006.01) |
| *G02B 27/01* | (2006.01) |
| *H04N 9/31* | (2006.01) |

(Continued)

(52) U.S. Cl.
CPC ....... *G06K 9/00604* (2013.01); *G02B 3/0056* (2013.01); *G02B 27/0093* (2013.01); *G02B 27/0172* (2013.01); *G06K 9/0061* (2013.01); *G06K 9/2036* (2013.01); *G06T 7/73* (2017.01); *H04N 9/3173* (2013.01); *G02B 2027/0138* (2013.01); *G06T 2207/10048* (2013.01); *G06T 2207/30201* (2013.01); *H04N 9/3161* (2013.01)

(58) Field of Classification Search
CPC ..... G06K 9/00604; G06T 7/73; H04N 9/3173
USPC ......................................... 348/158
See application file for complete search history.

(56) References Cited

U.S. PATENT DOCUMENTS 8,878,749 B1 * 11/2014 Wu .................. G01S 17/06
345/8
9,354,445 B1 * 5/2016 Weaver .............. G02B 27/0093
(Continued)

*Primary Examiner* — Amir Shahnami
(74) *Attorney, Agent, or Firm* — Ziegler IP Law Group LLC

(57) ABSTRACT

A gaze-tracking system for use in a head-mounted display apparatus. The gaze-tracking system includes: at least one first optical element comprising particles of a phosphorescent or fluorescent material dispersed therein, the particles of the phosphorescent or fluorescent material being dispersed in a manner that when excited by electromagnetic radiation incident thereupon, the particles produce structured light of a given wavelength, wherein the produced structured light illuminates a user's eye; at least one camera for capturing an image of reflections of the structured light from the user's eye, wherein the image is representative of a form of the reflections and a position of the reflections on an image plane of the at least one camera; and a processor coupled in communication with the at least one camera, wherein the processor is configured to process the captured image to detect a gaze direction of the user.

15 Claims, 8 Drawing Sheets

Related U.S. Application Data continuation-in-part of application No. 15/366,424, filed on Dec. 1, 2016, now Pat. No. 9,711,072.

(51) Int. Cl.
*G02B 3/00* (2006.01)
*G06T 7/73* (2017.01)

(56) References Cited

U.S. PATENT DOCUMENTS

| | | | | |
|---|---|---|---|---|
| 2005/0057177 | A1* | 3/2005 | Lu | H01L 51/5275 315/169.3 |
| 2012/0294478 | A1* | 11/2012 | Publicover | G06K 9/00604 382/103 |
| 2013/0176533 | A1* | 7/2013 | Raffle | A61B 3/113 351/209 |
| 2015/0070901 | A1* | 3/2015 | Rich | F21V 5/02 362/311.01 |
| 2015/0109191 | A1* | 4/2015 | Johnson | G06F 3/013 345/156 |
| 2017/0068311 | A1* | 3/2017 | Evans | G06F 3/011 |

\* cited by examiner

GAZE-TRACKING SYSTEM AND METHOD OF TRACKING USER'S GAZE

CROSS-REFERENCE TO RELATED APPLICATIONS

This application is a continuation-in-part of U.S. patent application Ser. No. 15/648,886, titled "GAZE-TRACKING SYSTEM AND METHOD OF TRACKING USER'S GAZE" and filed on Jul. 13, 2017, which is incorporated herein by reference. Furthermore, the U.S. patent application Ser. No. 15/648,886 is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, which is also incorporated herein by reference.

TECHNICAL FIELD

The present disclosure relates generally to display apparatuses; and more specifically, to gaze-tracking systems for use in head-mounted display apparatuses, such gaze-tracking systems comprising illuminators, optical elements, cameras and processors. Furthermore, the present disclosure also relates to methods of tracking a user's gaze via the aforementioned gaze-tracking systems.

BACKGROUND

In recent times, there has been a rapid increase in use of technologies such as virtual reality, augmented reality, and so forth, for presenting a simulated environment (or a virtual world) to a user. Typically, the user uses a specialized device (for example, such as a virtual reality device, an augmented reality device, and the like) for experiencing such simulated environment. Furthermore, in use, the user generally wears (namely, supports) the device on his/her head.

Nowadays, such devices often employ a technique such as gaze-tracking (namely, eye tracking) to determine a gaze direction of the user. Typically, the gaze-tracking is associated with determination of position of pupils of the user's eyes. Generally, an illumination source is employed for emitting light towards the user's eyes, and a camera is employed for of the emitted light from the user's eyes. Furthermore, reflection of the capturing an image depicting the pupils of the user's eyes and reflection(s) emitted light from the user's eyes is used as reference for determining the position of the pupils of the user's eyes with respect to the reflections. Typically, a plurality of illuminators are used to produce multiple reflections for such determination of position of the pupils of the user's eyes. Moreover, the captured image is employed to determine the gaze direction of the user.

However, there exist a number of limitations associated with implementations of the aforementioned gaze-tracking techniques. Firstly, a portion of the reflections may be occluded when the user's eyes are partially closed. In such an instance, some of the reflections may be absent (namely, some light may not be reflected by the surface of the user's eyes). Consequently, such occlusion of the reflections leads to inaccurate determination of the position of the pupils of the user's eyes. Secondly, since some of the reflections may be obscured by eyelids of the user, positions of the visible reflections may be inaccurately identified. Such inaccurate identification of the position of the visible reflections further leads to inaccuracies in gaze detection. Thirdly, various ambient light sources may be present near the user that may emit light towards the user's eyes. In such an instance, reflections of ambient light may be inaccurately considered to be reflections of the light emitted by the plurality of illuminators. Consequently, in such a case, the position of the pupils of the user's eyes is inaccurately determined. Fourthly, existing gaze-tracking techniques do not compensate for changes in pupil geometry (namely, on account of pupil contraction and pupil dilation). Consequently, additional inaccuracies (for example, such as geometric aberrations, reflection artefacts, and the like) are introduced whilst tracking the user's gaze. Also, employing the plurality of illuminators inside the device may increase complexity associated with physical design of the aforesaid specialized devices.

Therefore, in light of the foregoing discussion, there exists a need to overcome the aforementioned drawbacks associated with conventional gaze-tracking techniques.

SUMMARY

The present disclosure seeks to provide a gaze-tracking system for use in a head-mounted display apparatus.

The present disclosure also seeks to provide a method of tracking a user's gaze, via a gaze-tracking system of a head-mounted display apparatus.

The present disclosure seeks to provide a solution to the existing problem of inaccuracies in existing gaze-tracking techniques due to occlusion of some of multiple reflections. An aim of the present disclosure is to provide a solution that overcomes at least partially the problems encountered in the prior art, and provides a robust and efficient gaze-tracking system that eliminates inaccuracies associated with use of existing gaze-tracking techniques.

In one aspect, an embodiment of the present disclosure provides a gaze-tracking system for use in a head-mounted display apparatus, the gaze-tracking system comprising:
  at least one first optical element comprising particles of a phosphorescent or fluorescent material dispersed therein, the particles of the phosphorescent or fluorescent material being dispersed in a manner that when excited by electromagnetic radiation incident thereupon, the particles produce structured light of a given wavelength, wherein the produced structured light is to be used to illuminate a user's eye when the head-mounted display apparatus is worn by the user;
  at least one camera for capturing an image of reflections of the structured light from the user's eye, wherein the image is representative of a form of the reflections and a position of the reflections on an image plane of the at least one camera; and
  a processor coupled in communication with the at least one camera, wherein the processor is configured to process the captured image to detect a gaze direction of the user.

In another aspect, an embodiment of the present disclosure provides a method of tracking a user's gaze, via a gaze-tracking system of a head-mounted display apparatus, the method comprising:
  producing structured light, via at least one first optical element of the gaze-tracking system, to illuminate a user's eye when the head-mounted display apparatus is worn by the user, the at least one first optical element comprising particles of a phosphorescent or fluorescent material dispersed therein, the particles of the phosphorescent or fluorescent material being dispersed in a manner that when excited by electromagnetic radiation incident thereupon, the particles produce the structured light of a given wavelength;

capturing an image of reflections of the structured light from the user's eye, via at least one camera of the gaze-tracking system, wherein the image is representative of a form of the reflections and a position of the reflections on an image plane of the at least one camera; and processing the captured image to detect a gaze direction of the user.

Embodiments of the present disclosure substantially eliminate or at least partially addresses the aforementioned problems in the prior art, and enables enable accurate and efficient tracking of the user's gaze.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
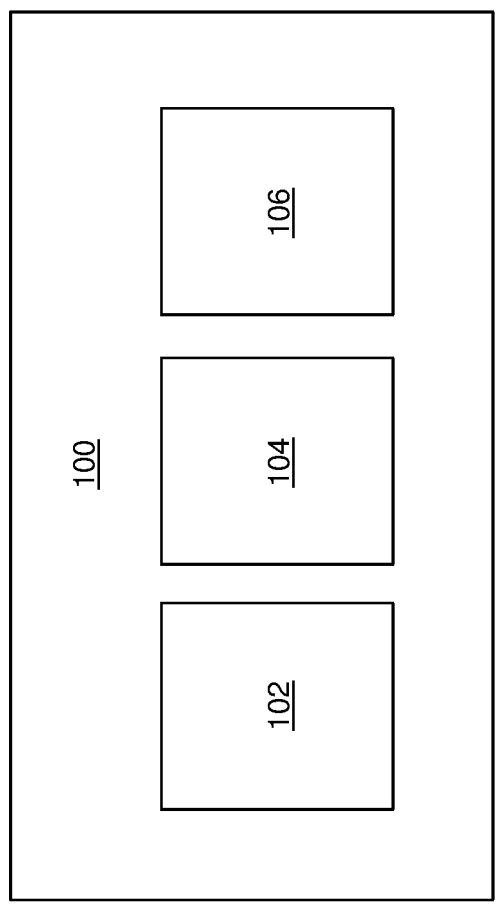
FIG. 1 illustrates a block diagram of a gaze-tracking system for use in a head-mounted display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a gaze-tracking system for use in a head-mounted display apparatus, the gaze-tracking system comprising:

at least one first optical element comprising particles of a phosphorescent or fluorescent material dispersed therein, the particles of the phosphorescent or fluorescent material being dispersed in a manner that when excited by electromagnetic radiation incident thereupon, the particles produce structured light of a given wavelength, wherein the produced structured light is to be used to illuminate a user's eye when the head-mounted display apparatus is worn by the user;

at least one camera for capturing an image of reflections of the structured light from the user's eye, wherein the image is representative of a form of the reflections and a position of the reflections on an image plane of the at least one camera; and a processor coupled in communication with the at least one camera, wherein the processor is configured to process the captured image to detect a gaze direction of the user.

In another aspect, an embodiment of the present disclosure provides a method of tracking a user's gaze, via a gaze-tracking system of a head-mounted display apparatus, the method comprising:

producing structured light, via at least one first optical element of the gaze-tracking system, to illuminate a user's eye when the head-mounted display apparatus is worn by the user, the at least one first optical element comprising particles of a phosphorescent or fluorescent material dispersed therein, the particles of the phosphorescent or fluorescent material being dispersed in a manner that when excited by electromagnetic radiation incident thereupon, the particles produce the structured light of a given wavelength;

capturing an image of reflections of the structured light from the user's eye, via at least one camera of the gaze-tracking system, wherein the image is representative of a form of the reflections and a position of the reflections on an image plane of the at least one camera; and processing the captured image to detect a gaze direction of the user.

The aforementioned gaze-tracking system and the method of tracking a user's gaze employ the particles of phosphorescent or fluorescent material dispersed on the at least one first optical element, to illuminate the user's eye with the structured light when the head-mounted display apparatus is worn by the user. Such use of the structured light enables to accurately determine the positions of reflections of the structured light based on a form thereof. Consequently the detected gaze direction by using such structured light is highly accurate. Additionally, the use of the structured light allows for substantially overcoming errors associated with occlusion of reflections of light. Furthermore, errors associated with presence of reflections from ambient light sources are substantially minimized within the described gaze-tracking system. Moreover, the gaze-tracking system accommodates changes in pupil geometry whilst tracking the user's gaze. Beneficially, the aforementioned gaze-tracking system allows for determining an orientation of the user's eye. It will also be appreciated that such a gaze-tracking system allows for reducing complexity associated with physical design of the aforesaid head-mounted display apparatuses.

Throughout the present disclosure, the term "head-mounted display apparatus" used herein relates to specialized equipment that is configured to display a visual scene to the user thereof when the head-mounted display apparatus is worn by the user on his/her head. In such an instance, the head-mounted display apparatus is operable to act as a device (for example, such as a virtual reality headset, an augmented reality headset, a pair of virtual reality glasses, a pair of and augmented reality glasses, and so forth) for presenting the visual scene to the user.

Throughout the present disclosure, the term "gaze-tracking system" used herein relates to specialized equipment for detecting a direction of gaze (namely, the gaze direction) of the user. The head-mounted display apparatus uses the gaze-tracking system for determining the aforesaid gaze direction via non-invasive techniques. Beneficially, an accurate detection of the gaze direction facilitates the head-mounted display apparatus to closely implement gaze contingency thereon. As an example, the gaze-tracking system may be employed to detect the gaze direction of the user's eye for projecting (i) a region of a visual scene whereat the user's gaze is focused, on and around the fovea of the user's eye, and (ii) a remaining region of the visual scene on the retina of the user's eye, of which the fovea is just a small part. Therefore, even upon a change in the gaze direction (namely, due to a movement of the user's eye), active foveation is implemented within the head-mounted display apparatus.

It is to be understood that the gaze-tracking system may also be referred to as an "eye-tracker system", a "means for detecting a gaze direction", a "means for tracking a gaze direction", or a "gaze-tracking unit".

The at least one first optical element relates to an optical component that uses phosphorescent or fluorescent materials to produce the structured light for illuminating the user's eye. Therefore, the at least one first optical element is arranged in a manner that the electromagnetic radiation is incident thereupon for producing the structured light.

Optionally, the at least one first optical element is implemented by way of at least one: a flexible transparent film, flexible transparent foil, a semi-transparent mirror, a fully reflective mirror, a prism, a polarizer, a beam splitter (namely, a half mirror), a glass plate, a lens, an optical waveguide.

The particles of phosphorescent or fluorescent material are dispersed in the at least one first optical element. It will be appreciated that molecules of the particles of the phosphorescent or fluorescent material get excited upon being energized by the electromagnetic radiation. Upon reaching such an excitation state, the molecules emit radiation (namely, light) therefrom. Examples of such particles of the phosphorescent and the fluorescent material include, but are not limited to, zinc sulfide and strontium aluminate, calcium sulfide, and alkaline earth metal silicate and Quinine.

Optionally, a foil comprising the particles of phosphorescent or fluorescent material dispersed therein, is laminated or glued onto the at least one first optical element. Optionally, in such a case, an adhesive is used for laminating or gluing the foil onto the at least one first optical element. It will be appreciated that such a foil may be transparent or semi-transparent.

Optionally, the particles of phosphorescent or fluorescent material are printed upon a surface of the at least one first optical element. In such a case, an ink comprising pigments of phosphorescent or fluorescent material is used for implementing the aforesaid printing operation. Optionally, in such a case, the ink is an infrared ink. Beneficially, the infrared ink is invisible to the user. The ink, when printed upon the at least one first optical element, is allowed to dry off such that the particles of phosphorescent or fluorescent material are dispersed thereon properly. Examples of printing techniques employed for printing the particles of phosphorescent or fluorescent material on the surface of the at least one first optical element includes, but are not limited to, screen printing, spray coating, foil stamping and the like.

Optionally, the gaze-tracking system comprises at least one source of the electromagnetic radiation. It will be appreciated that the term "at least one source" used herein relates to a device (namely, an equipment) configured to emit the electromagnetic radiation therefrom. Optionally, in this regard, the at least one source is configured to emit the electromagnetic radiation towards the at least one first optical element. Alternatively, optionally, the at least one source is configured to emit the electromagnetic radiation towards at least one substantially-reflective element of the gaze-tracking system, wherein the at least one substantially-reflective element is configured to direct the electromagnetic radiation towards the at least one first optical element. Optionally, the at least one substantially-reflective optical element is implemented by way of at least one of: a semi-transparent mirror, a fully reflective mirror, a semi-transparent reflector, a prism.

It will be appreciated that the electromagnetic radiation could be visible light, infrared light, radio waves, gamma rays and X-rays.

Optionally, the at least one source could emit the electromagnetic radiation periodically or intermittently. Alternatively, optionally, the at least one source emits electromagnetic radiation continuously.

Optionally, an intensity of the electromagnetic radiation emitted by the at least one source is adjustable. Optionally, in this regard, the processor is configured to control the at least one source of the electromagnetic radiation to adjust the intensity of the electromagnetic radiation emitted therefrom.

Optionally, the at least one source of the electromagnetic radiation is implemented by way of at least one of: infrared light-emitted diodes, infrared lasers, infrared light projectors, infrared light-emitting diode based displays, visible light-emitting diodes, visible light lasers, visible light projectors, visible light-emitting diode based displays.

Optionally, the gaze-tracking system comprising at least one light guide for guiding the electromagnetic radiation emitting from the at least one source towards the at least one first optical element. Throughout the present disclosure, the term "light guide" used herein relates to an optical element that is operable to guide (namely, direct) the electromagnetic radiation emitted by the at least one source towards the at least one first optical element.

Optionally, the head-mounted display apparatus comprises at least one image renderer for rendering an input image, and wherein the particles of the phosphorescent or fluorescent material are to be excited by the electromagnetic radiation produced by the at least one image renderer, so as to produce the structured light of the given wavelength. Notably, the at least one image renderer produces a projection of the rendered input image, that constitutes the aforesaid electromagnetic radiation. It will be appreciated that projection of the rendered input image is visible to the user. In operation, when such a projection of the rendered input image (or any of its constituent projections) passes through the at least one first optical element, the particles of the phosphorescent or fluorescent material are excited to produce the structured light of the given wavelength.

Optionally, the given wavelength is an infrared wavelength or a near-infrared wavelength. The structured light of infrared or near-infrared wavelength is invisible to the human eye, thereby, reducing unwanted distraction when such structured light is incident upon the user's eye. Alternatively, optionally, the given wavelength is a visible wavelength.

The given wavelength of the structured light is based upon at least one of: wavelength of the electromagnetic radiation (namely, excitation wavelength), intensity of the electromagnetic radiation, frequency of the electromagnetic radiation and emission properties of the phosphorescent or fluorescent material.

It is to be understood that the given wavelength (of the structured light) may also be referred to as an "emission wavelength".

Throughout the present disclosure, the term "structured light" used herein refers to light that is emitted onto a surface (such as a cornea of the user's eye) in a predefined pattern, such as a matrix or a grid. In an example, the structured light is produced in a pattern such as linear, circular, triangular, rectangular, concentric circular (such as, circles having decreasing or increasing diameters with respect to each other and having a common center) and so forth. In another embodiment, the structured light is produced in a predefined pattern comprising text (such as one or more alphabets), symbols (such as symbol for Greek letter omega (Ω)), designs (such as logos) and so forth.

Optionally, when the structured light is incident upon the surface of the user's eye, its reflections appear in a form of a plurality of glints, wherein the plurality of glints have a predefined shape. Optionally, the predefined shape has a pattern comprising six characters arranged into two columns of three characters each. Alternatively, optionally, the predefined shape has a pattern comprising nine characters arranged into three columns of three characters each. More optionally, the characters are substantially V-shaped. Optionally, a middle character of a given column is oriented differently from other characters of the given column. In this regard, the particles of the phosphorescent or fluorescent material are arranged in a manner such that produced structured light, when incident on the user's eye, produce the plurality of glints having the aforesaid pattern. In an example, if a first and a third character of the given column is ">", then a second character (namely, the middle character) of the given column may be "<". Beneficially, such a pattern of the plurality of glints provides a unique, distinguishable shape of the structured light. Therefore, it is easier to distinguish between the structured light and unwanted light from ambient light sources. Optionally, the shape of the plurality of glints comprises characters having a symmetrical shape about only one axis. Notably, a shape of such characters only repeats when such characters are rotated through 360 degrees, thereby, allowing for rotation of the plurality of glints to be clearly discernable. Examples of such shapes include, but are not limited to "U", "Y" and "T".

It will be appreciated that shape of the user's eye is spherical; therefore, the reflections of the structured light from a curved surface may get distorted. Thus, the structured light is projected on a region (for example, iris of the user's eye) of the user's eye where such distortion would be minimum.

In an implementation, the at least one first optical element comprises particles of the phosphorescent material dispersed therein. In such a case, when excited by the electromagnetic radiation, the particles of the phosphorescent material produce the structured light of the given wavelength. It will be appreciated that the particles of the phosphorescent material can emit structured light having a durations ranging from a fraction of a second up to several hours, after the electromagnetic radiation is incident thereupon.

In another implementation, the at least one first optical element comprises particles of the fluorescent material dispersed therein. In such a case, when excited by the electromagnetic radiation, the particles of the fluorescent material produce the structured light of the given wavelength. It will be appreciated that the particles of the fluorescent material can emit structured light only until the particles are excited by the electromagnetic radiation. When the electromagnetic radiation is not incident thereupon, the particles of the fluorescent material will not produce the structured light.

In yet another implementation, the at least one first optical element comprises the particles of the phosphorescent and fluorescent material dispersed therein. In such a case, when the electromagnetic radiation is incident upon the at least one first optical element, the particles of both the phosphorescent and fluorescent material produce the structured light. Notably, when the electromagnetic radiation is not incident upon the at least one first optical element, only the particles of the phosphorescent material produce the structured light whilst the particles of the fluorescent material do not produce any light.

It will be appreciated that the structured light is reflected from the user's eye, for example, from the cornea of the user's eye. In such an instance, the at least one camera is operable to capture the image of the reflections of the structured light. In one implementation, the at least one camera is positioned in an optical path of the reflections of the structured light to capture the image thereof. In such a case, the at least one camera is positioned in a manner such that the user's view is not obstructed. In another implementation, the at least one first optical element is arranged on an optical path of the reflections of the structured light, namely between the user's eye and the at least one camera. Optionally, in such an implementation, the at least one first optical element is configured to pass the reflections of the structured light therethrough, towards the at least one camera. Alternatively, optionally, in such an implementation, the at least one first optical element is configured to direct (for example, by reflection, refraction, diffraction, or a combination thereof) the reflections of the structured light towards the at least one camera.

In operation, the at least one camera captures the image of reflections of the structured light from the user's eye. The image is representative of the form and the position of the reflections on the image plane of the at least one camera. In such an instance, the image depicts positions and/or arrangement (namely, intergeometry) of the reflections of the structured light. In other words, the image depicts the positions and/or arrangement of the plurality of glints formed on the outer surface of the user's eye.

It will be appreciated that the term "image plane of the at least one camera" generally relates to a region of the at least one camera whereat the reflections of the structured light are focused, to create the aforesaid image. In other words, the image plane of the at least one camera is an imaging surface of the at least one camera, and lies within the at least one camera. Optionally, the image plane of the at least one camera is implemented by way of at least one chip comprising a plurality of photo-sensitive elements implemented thereon. Examples of the at least one camera include, but are not limited to, a digital camera, a black-and-white camera, a Red-Green-Blue (RGB) camera, and an Infra-Red (IR) camera. The form of the reflections and the position of the reflections of the structured light from the user's eye, depicted in the captured image, are used to determine a gaze direction of the user's eye. Optionally, such a captured image is also employed to determine a geometry (namely, shape and structure) of the user's eye. It will be appreciated that human eye has an irregular shape, such as a shape that substantially deviates from a perfect sphere. Therefore, the structured light is reflected at different angles by different regions of the user's eye.

Optionally, the reflections of the structured light, represented in the captured image, appear as the plurality of glints positioned within a substantially circular region of the surface of the user's eye, the plurality of glints being arranged into at least two columns, each of the plurality of glints being symmetrical about only one axis. It will be appreciated that the circular region of the user's eye substantially corresponds to a region comprising the iris of the user's eye and/or the user's pupil. Such a structured arrangement of the plurality of glints (owing to the pattern of the structured light) allows for easily distinguishing the plurality of glints from reflections of light from ambient sources. Beneficially, the plurality of glints are utilized as a frame of reference to detect the positioning of the user's pupil. Moreover, since the plurality of the glints are symmetrical about only one axis, the orientation of the plurality of glints can be accurately recognized even upon rotation thereof, based upon their shape.

More optionally, the plurality of glints are in a form of six characters that are arranged into two columns of three characters each, the characters being substantially V-shaped. In one embodiment, a first column of three characters is arranged on a right region of the user's eye, whilst a second column is arranged on a left region user's eye. In another embodiment, a first column of three characters is arranged on the left region of the user's eye, whilst a second column is arranged on the right region user's eye. In yet another embodiment, the first column of three characters is arranged on a top region of the user's eye, whilst a second column is arranged on a bottom region of the user's eye. In still another embodiment, the first column of three characters is arranged on the bottom region of the user's eye, whilst a second column is arranged on the top region of the user's eye. It will be appreciated substantially V-shaped characters are symmetrical about the only one axis; therefore, orientations of the V-shaped characters can be accurately recognized even upon rotation thereof, based upon their shape. In an example, the V-shaped characters may also be represented as "V". It will be appreciated that when the V-shaped characters are rotated by 90 degrees in clockwise direction, the V-shaped characters may be represented as "<". Similarly, when the V-shaped characters may be rotated by 180 degrees and 270 degrees in clockwise direction, the V-shaped characters may be represented as "\/" and ">" respectively. Furthermore, when rotated by 360 degrees, the V-shaped characters are represented as "V" which is similar to the original shape of the V-shaped characters. Thus, the character "V" is symmetrical about only one axis.

Moreover, optionally, a middle character of a given column is to be oriented differently from other characters of the given column. In an example, if a top character (namely, the first character) and a bottom character (namely, the third character) of the given column are represented as ">", the middle character (for example, a second character present between the first character and third character) may be represented as "<". It will be appreciated that such orientation of the middle character of the given column allows for precisely determining the positions of each of the top, the middle and the bottom characters of the given column. Therefore, such an arrangement of the plurality of glints could be employed to determine the gaze direction of the user in instances wherein at least one glint among the plurality of glints is not visible (namely, is not depicted) in the captured image (for example, when the user's eyes are partially closed). As an example, the structured light may have a pattern such that the top characters of the two columns should be represented as "<" and ">", the middle characters of the two columns should be represented as ">" and "<" and the bottom characters of the two columns should be represented as "<" and ">" respectively in the captured image. In such an instance, if the captured image only depicts the middle and the bottom characters, the top characters are determined to be occluded by the user's eye.

The processor is configured to receive the captured image depicting the reflections of the structured light from the at least one camera. The processor is configured to process the captured image to determine the form and the position of the reflections of the structured light in the captured image. Optionally, the processor is configured to determine a position and an orientation of user's pupil with respect to the form and the position of the reflections of the structured light in the captured image to detect the gaze direction of the user. It will be appreciated that use of the structured light enables the processor to determine the position and the orientation of the user's pupil with respect to the form and position of reflections of the structured light. For example, even when some of the reflections of the structured light are not visible in the captured image, the visible reflections can still be utilized to allow determination of the user's gaze with high certainty based upon the form and position of the visible reflections of the structured light.

Furthermore, in an exemplary implementation wherein the plurality of glints are in the form of six characters, if more than six characters are observed in the captured image, the form and positions of the reflections of the structured light can be easily and accurately distinguished from the reflections of light from ambient light sources. Notably, the shapes and orientations of the plurality of glints are uniquely discernable. Therefore, it will be appreciated that such determination of the user's gaze by employing the structured light allows for reducing errors and enhancing gaze-detection accuracy.

Optionally, when processing the captured image, the processor is configured to identify a polygon defined by the plurality of glints, and to determine the position of the user's pupil with respect to the polygon, so as to detect the gaze direction of the user. In such a case, optionally, the polygon is defined by corners of the plurality of glints. In an example, if the plurality of glints are in a form of two columns of V-shaped characters, corners of the polygon are defined by corner-most V-shaped characters. In another example, the polygon may be defined by a line passing through all the plurality of glints. Optionally, the plurality of glints are substantially reflected from the iris of the user's eye and the polygon is therefore substantially defined around the user's pupil. In operation, the processor is configured to determine the position of the user's pupil with respect to the polygon.

In an example, the position of the user's pupil may be at a center of the polygon. In such an example, the processor may process the captured image to detect that the user is gazing at a central region of the visual scene (depicted in the input image). In another example, the position of the user's pupil may be at a right region of the polygon. In such an example, the processor may process the captured image to detect that the user is gazing at a left side region of the visual scene (depicted in the input image).

As mentioned previously, the processor optionally processes the captured image depicting the reflections of the structured light to determine the geometry of the user's eye. In such a case, angles of reflection of the structured light may be different when the structured light is incident upon different regions of the user's eye. Therefore, orientation and/or size of the plurality of glints allow for identifying geometry of their corresponding regions of the user's eye. In an example, the depicted plurality of glints may comprise six characters arranged into two columns of three characters each. Optionally, in such an example, the middle characters of the two columns are oriented differently from other characters of the two columns. Furthermore, one column may be formed on a right region of the user's eye, while the other column may be formed on a left region of the user's eye. In such a case, a first character is formed on a top-right region of the user's eye, a second character is formed on a middle-right region of the user's eye, and a third character is formed on a bottom-right region of the user's eye. Similarly, a fourth character is formed on a top-left region of the user's eye, a fifth character is formed on a middle-left region of the user's eye, and a sixth character is formed on a bottom-left region of the user's eye. It will be appreciated that the structured light incident upon the middle-right region and the middle-left region of the user's eye will be reflected at an angle such that the form of the second and the fifth characters are substantially similar to their emitted form (within the structured light). However, the structured light incident upon other regions of the user's eye (such as, top and bottom portions) will be reflected at substantially greater angles as compared to the structured light incident upon the middle regions of the user's eye. In such an instance, the form of the first, third, fourth and sixth characters is substantially different from their emitted form (within the structured light). Optionally, in this regard, the processor is configured to store the form and the position of the structured light as well as the form and the position (namely, relative position) of the plurality of glints. The processor compares the aforesaid forms and positions to identify similarities and/or differences therebetween. Consequently, the processor is configured to determine the geometry of the user's eye.

Optionally, the processor is configured to calibrate the gaze-tracking system by (i) determining an initial position of the head-mounted display apparatus with respect to the user's eye, whilst recording the form and the position of the reflections of the structured light as represented by a first image captured by the at least one camera. For example, when the head-mounted display apparatus is worn by the user, a calibration sequence may be started. In such an instance, upon adjustment of the head-mounted display apparatus by the user according to requirements thereof (such as, in a comfortable position), the user's eye is illuminated by the at least one illuminator. Subsequently, the first image is captured by the at least one camera to determine the initial position of the head-mounted display apparatus with respect to the user's eye. Such a captured first image will be representative of the form and the position of the reflections of structured light corresponding to the initial position of the head-mounted display apparatus with respect to the user's eye.

Furthermore, optionally, the processor is configured to calibrate the gaze-tracking system by (ii) storing information indicative of the initial position with respect to the recorded form and position of the reflections. For example, the form and the position of the reflections as represented by the captured first image that is stored, optionally, in a memory unit communicably coupled to the processor. In another example, the processor is operable to store numerical values associated with the form and the position of the reflections, such as numerical values of coordinates associated with the reflections as represented by the captured first image.

Moreover, optionally, the processor is configured to calibrate the gaze-tracking system by (iii) determining a change in the position of the head-mounted display apparatus with respect to the user's eye, based upon a change in the form and/or the position of the reflections as represented by a second image captured at a later time with respect to the recorded form and position of the reflections. For example, in operation, the head-mounted display apparatus may shift from the initial position thereof on the user's head due to movement of the user's head. In such an instance, the processor is operable to control the at least one camera to capture the second image representative of the form and/or the position of the reflections due to such movement of the user's head. In one example, the processor is configured to control the at least one camera to capture new images at regular intervals during operation, such as, at every five seconds during operation of the head-mounted display apparatus. Furthermore, the processor is operable to compare the form and positions of reflections in the new images with the initial position of the form and position of the reflections (depicted in the first image) to determine changes in positions of the head-mounted display apparatus, and subsequently, calibrate the gaze-tracking system according to such changes.

Optionally, the processor is configured to indicate the user to look straight for calibrating the gaze-tracking system with respect to the user's eye. The user may be indicated to look straight to capture the first image.

Optionally, the at least one first optical element further comprises a plurality of microlenses for directing light intensity of the structured light. In such a case, the plurality of micro lenses are positioned on an optical path of the structured light. Since the shape of the user's eye is substantially spherical, the reflections of the structured light from such a curved surface may get distorted. Thus, the plurality of the microlenses are arranged in a manner that the light intensity of the structured light is directed upon regions of the surface (for example, iris of the user's eye) of the user's eye whereat the distortion is minimum.

Optionally, the plurality of microlenses modifies an optical path and/or optical characteristics of the produced structured light prior to directing the structured light towards the user's eye.

Optionally, the plurality of microlenses are provided by roll-to-roll imprinting on the at least one first optical element. In an embodiment, the plurality of microlenses employ diffractive optics. In such as case, the optical path and/or optical characteristics of the structured light passing through the plurality of microlenses are modified by way of diffraction.

In another embodiment, the plurality of microlenses employ refractive optics. In such as case, the optical path and/or optical characteristics of the structured light passing through the plurality of microlenses are modified by way of refraction.

Example of the plurality of microlenses include, but are not limited to, convex lenses, plano-convex lenses, Liquid Crystal (LC) lenses, liquid lenses, aspherical lenses, achromatic lenses.

Optionally, the gaze-tracking system further comprises at least one second optical element that is substantially transparent for visible light, but is substantially reflective for infrared light. Optionally, the structured light is reflected from the user's eye towards the at least one second optical element. The at least one second optical element is optically configured in a manner to allow the visible light to pass therethrough substantially, whilst reflecting the infrared light (for example, such as the reflections of the structured light) substantially. Such an arrangement of the at least one second optical element facilitates in altering the optical path of the reflections of the structured light towards the at least one camera, whilst allowing the visible light to pass therethrough. Therefore, unwanted visible light is not captured by the at least one camera.

Optionally, the at least one second optical element is implemented by way of at least one of: a semi-transparent mirror, a semi-transparent film, a prism, a polarizer, an optical waveguide.

Optionally, the head-mounted display apparatus comprises at least one image renderer for rendering an input image, the at least one second optical element being positioned on an optical path of the projection of the rendered input image and on an optical path of the reflections of the structured light. Therefore, the at least one second optical element that is substantially transparent for visible light, allows the projection of the rendered input image emanating from the at least one image renderer to pass towards the user's eye, whilst allowing the reflections of the structured light to be reflected towards the at least one camera. Therefore, the reflections of the structured light are prevented from passing towards the at least one image renderer, whilst ensuring that the projection of the rendered input image, having the visible wavelength, is projected onto the user's eye.

Optionally, the at least one image renderer is implemented by way of at least one of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one image renderer is implemented by way of a projection screen associated with at least one projector. Optionally, in this regard, the at least one projector is implemented by way of at least one of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

According to an embodiment, the term "input image" relates to a representation of a visual scene of a fully-virtual simulated environment (for example, a virtual reality environment) to be displayed via the head-mounted display apparatus.

According to another embodiment, the term "input image" relates to a representation of a visual scene depicting at least one virtual object overlaid on a real world image. Examples of the at least one virtual object include, but are not limited to, a virtual navigation tool, a virtual gadget, a virtual message, a virtual entity, and a virtual media. In such an instance, the at least one virtual object overlaid on the real world image constitutes a visual scene of a resultant simulated environment (for example, an augmented reality environment). Notably, the term "real world image" relates to an image depicting actual surroundings of the user whereat he/she is positioned. Optionally, the head-mounted display apparatus comprises an imaging system to capture the real world image. More optionally, the head-mounted display apparatus further comprises at least one optical equipment (for example, such as a mirror, a lens, a prism, and the like) to implement aforesaid overlaying operation and to project the resultant simulated environment onto the user' eyes.

According to yet another embodiment, the term "input image" used herein relates to a visual scene depicting a pictorial representation (namely, a visual perception) of a subject. Examples of the subject include, but are not limited to, an object, a person, a map, a painting, a graphical diagram, and text. Optionally, the input image is a two-dimensional representation of the subject.

In an embodiment the head-mounted display apparatus is configured to receive the input image from the memory unit communicably coupled thereto. The memory unit could be configured to store the input image in a suitable format including, but not limited to, Moving Pictures Experts Group (MPEG), Joint Photographic Experts Group (JPEG), Tagged Image File Format (TIFF), Portable Network Graphics (PNG), Graphics Interchange Format (GIF), and Bitmap file format (BMP).

In another embodiment, the head-mounted display apparatus is configured to receive the input image from the imaging system of the head-mounted display apparatus. In such an instance, an image sensor of the imaging system is configured to capture the input image. As an example, the input image may depict a coffee shop whereat the user is positioned.

It is to be understood that the input image may also be referred to as a "displayed image", a "virtual reality image", a "virtual object image", a "subject image".

Optionally, the at least one image renderer comprises at least one focus image renderer for rendering a focus image and at least one context image renderer for rendering a context image, wherein a projection of the rendered context image and a projection of the rendered focus image together form a projection of the aforesaid input image. Optionally, the projection of the rendered context image constitutes the electromagnetic radiation. In such a case, the at least one context image renderer is arranged in a manner that the projection of the rendered context image emitting therefrom is incident upon the at least one first optical element, thereby, exciting the particles of the phosphorescent or fluorescent material to produce the structured light. Additionally or alternatively, optionally, the projection of the rendered focus image constitutes the electromagnetic radiation. In such a case, the at least one focus image renderer is arranged in a manner that the projection of the rendered focus image emitting therefrom is incident upon the at least one first optical element, thereby, exciting the particles of the phosphorescent or fluorescent material to produce the structured light.

Optionally, in this regard, the head-mounted display apparatus comprises at least one optical combiner for optically combining the projection of the rendered context image with the projection of the rendered focus image to create the projection of the aforesaid input image. Furthermore, in such a case, the input image comprises the context image and the focus image. Therefore, the context and focus images are rendered substantially simultaneously, in order to collectively constitute the rendered input image. It will be appreciated that the context image relates to a wide image of the visual scene, to be rendered and projected via the head-mounted display apparatus. Furthermore, the focus image relates to another image depicting a part (namely, a portion) of the visual scene, to be rendered and projected via the head-mounted display apparatus. Moreover, the focus image is dimensionally smaller than the context image.

Optionally, an angular width of the projection of the rendered context image ranges from 40 degrees to 220 degrees, whereas an angular width of the projection of the rendered focus image ranges from 5 degrees to 60 degrees.

Optionally, the at least one context image renderer and/or the at least one focus image renderer are selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one context image renderer and/or the at least one focus image renderer are implemented by way of at least one projector and a projection screen associated therewith. Optionally, a single projection screen may be shared between separate projectors employed to implement the at least one context image renderer and the at least one focus image renderer. Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Throughout the present disclosure, the term "optical combiner" used herein relates to equipment (for example, such as optical elements) for optically combining the projection of the rendered context image and the projection of the rendered focus image to constitute the projection of the input image. Beneficially, the at least one optical combiner could be configured to simulate active foveation of a human visual system. In an embodiment, the at least one optical combiner is implemented by way of the at least second optical element.

Optionally, the gaze-tracking system comprises an exit optical element arranged on an optical path of the projection of the input image. Optionally, the exit optical element is configured to direct the projection of the input image towards the user's eye, namely when the head-mounted display apparatus is worn by the user. Optionally, the exit optical element modifies an optical path and/or optical characteristics of the projection of the input image prior to directing the projection of the input image towards the user's eye. In one example, the exit optical element may magnify a size (or angular dimensions) the projection of the input image.

In one embodiment, the exit optical element is arranged between the at least one display and the user's eye. In another embodiment, the exit optical element is arranged between the at least one first optical element and the user's eye. It will be appreciated that relative position of the at least one first optical element is interchangeable with the exit optical element.

Optionally, the exit optical element is implemented by way of at least one of: a convex lens, a plano-convex lens, a Liquid Crystal (LC) lens, a liquid lens, aspherical lens, achromatic lens.

Optionally, the gaze-tracking system further comprises at least one illuminator for emitting light pulses to illuminate the user's eye for enabling detection of the position of the user's pupil. It will be appreciated that wavelength of the light pulses emitted by the at least one illuminator is different from the wavelength of the structured light.

Optionally, the at least one illuminator emits the light pulses substantially towards the user's eye. It will be appreciated that the at least one other illuminator is optionally arranged for illuminating the user's eye so as to facilitate both bright-pupil tracking and dark-pupil tracking. Furthermore, for implementing the bright-pupil tracking, the light pulses emitted by the at least one illuminator are arranged to be incident upon the user's eye substantially along the view direction of the user's eye. Moreover, for implementing the dark-pupil tracking, the light pulses emitted by the at least one other illuminator are arranged to be incident upon the user's eye substantially away from (namely, offset from) the view direction of the user's eye.

The present disclosure also relates to the method as described above. Various embodiments and variants disclosed above apply mutatis mutandis to the method.

Optionally, in the method, the at least one first optical element further comprises the plurality of microlenses for directing light intensity of the structured light.

Optionally, in the method, the reflections of the structured light, represented in the captured image, appear as the plurality of glints positioned within the substantially circular region of a surface of the user's eye, the plurality of glints being arranged into at least two columns, each of the plurality of glints being symmetrical about only one axis. More optionally, in the method, the plurality of glints are in a form of six characters that are arranged into two columns of three characters each, the characters being substantially V-shaped. Optionally, in this regard, the middle character of the given column is oriented differently from other characters of the given column.

Optionally, in the method, the processing of the captured image comprises: identifying the polygon defined by the plurality of glints; and determining the position of the user's pupil with respect to the polygon, so as to detect the gaze direction of the user.

Optionally, in the method, the given wavelength is the infrared wavelength or the near-infrared wavelength Optionally, in the method, light pulses are emitted, via the at least one illuminator of the gaze-tracking system, to illuminate the user's eye for enabling detection of a position of a pupil of the user's eye.

DETAILED DESCRIPTION OF THE DRAWINGS

Referring to FIG. 1, illustrated is a block diagram of a gaze-tracking system 100 for use in a head-mounted display apparatus (not shown), in accordance with an embodiment of the present disclosure. The gaze-tracking system 100 comprises at least one first optical element 102 comprising particles of a phosphorescent or fluorescent material dispersed therein; at least one camera 104 for capturing an image of reflections of structured light from a user's eye; and a processor 106 in communication with the at least one camera 104, wherein the processor 106 is configured to process the captured image to detect a gaze direction of the user.

Figure 2A:
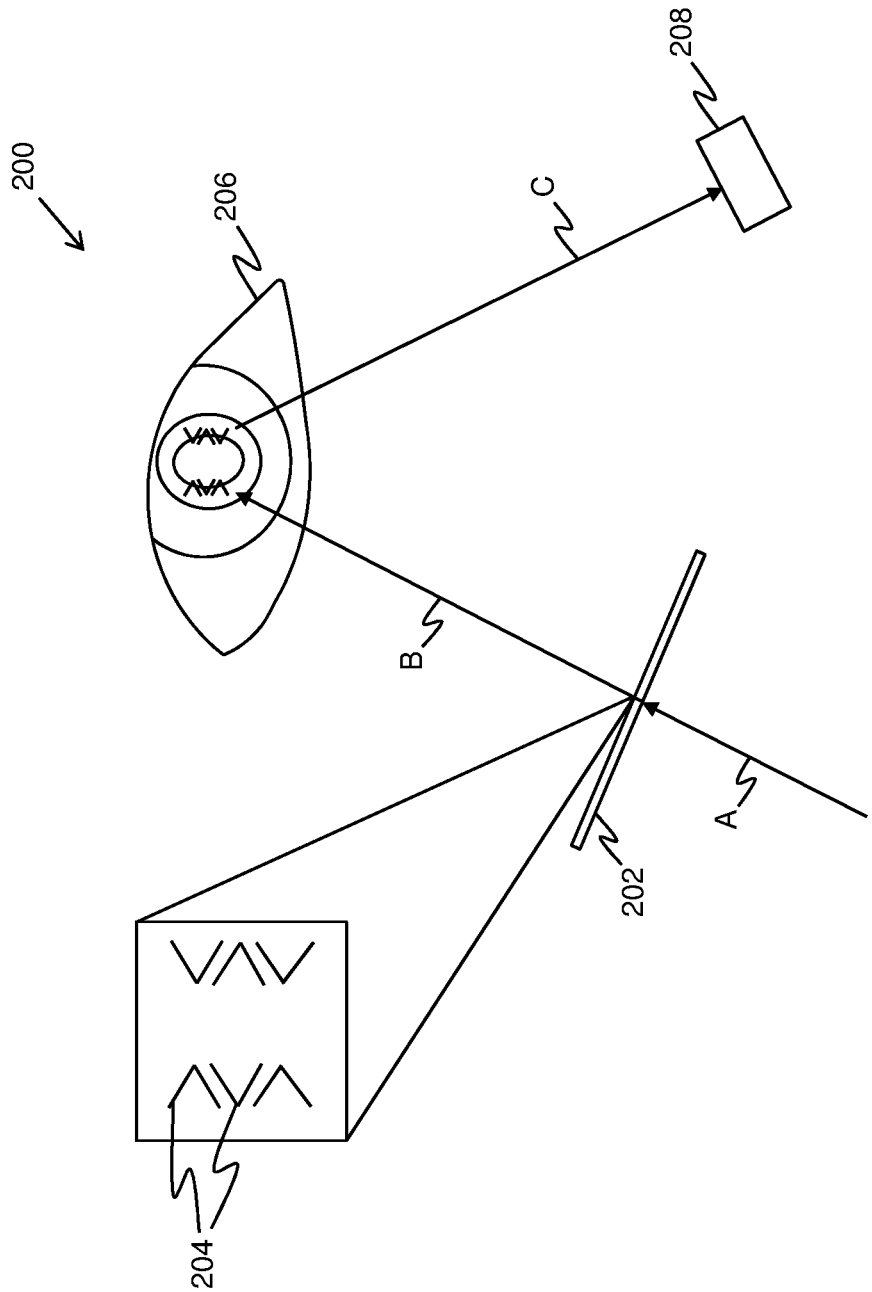
FIGS. 2A, 2B and 2C illustrate exemplary implementations of a gaze-tracking system in use within a head-mounted display apparatus, in accordance with different embodiments of the present disclosure.
Figure 2B:
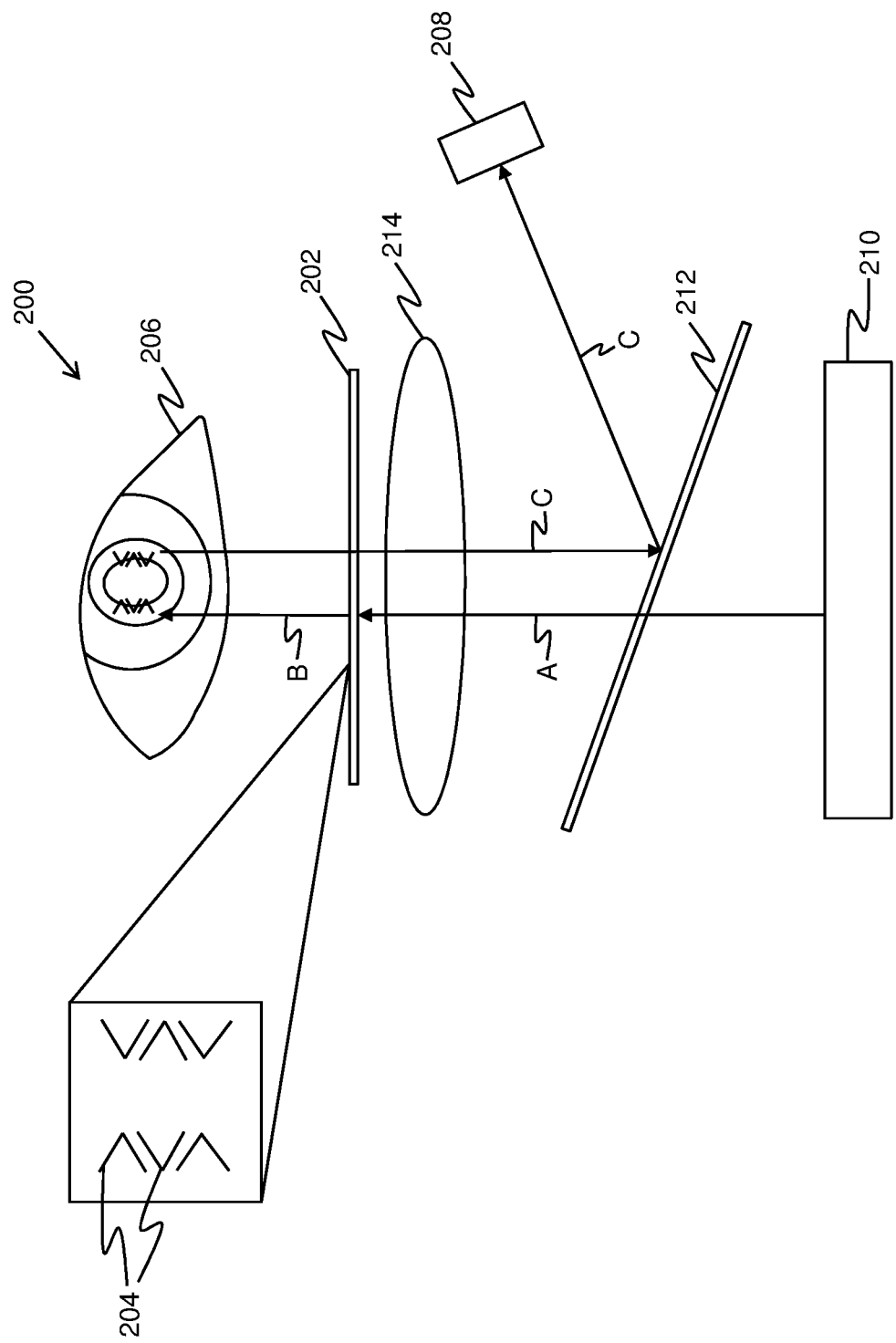
Figure 2C:
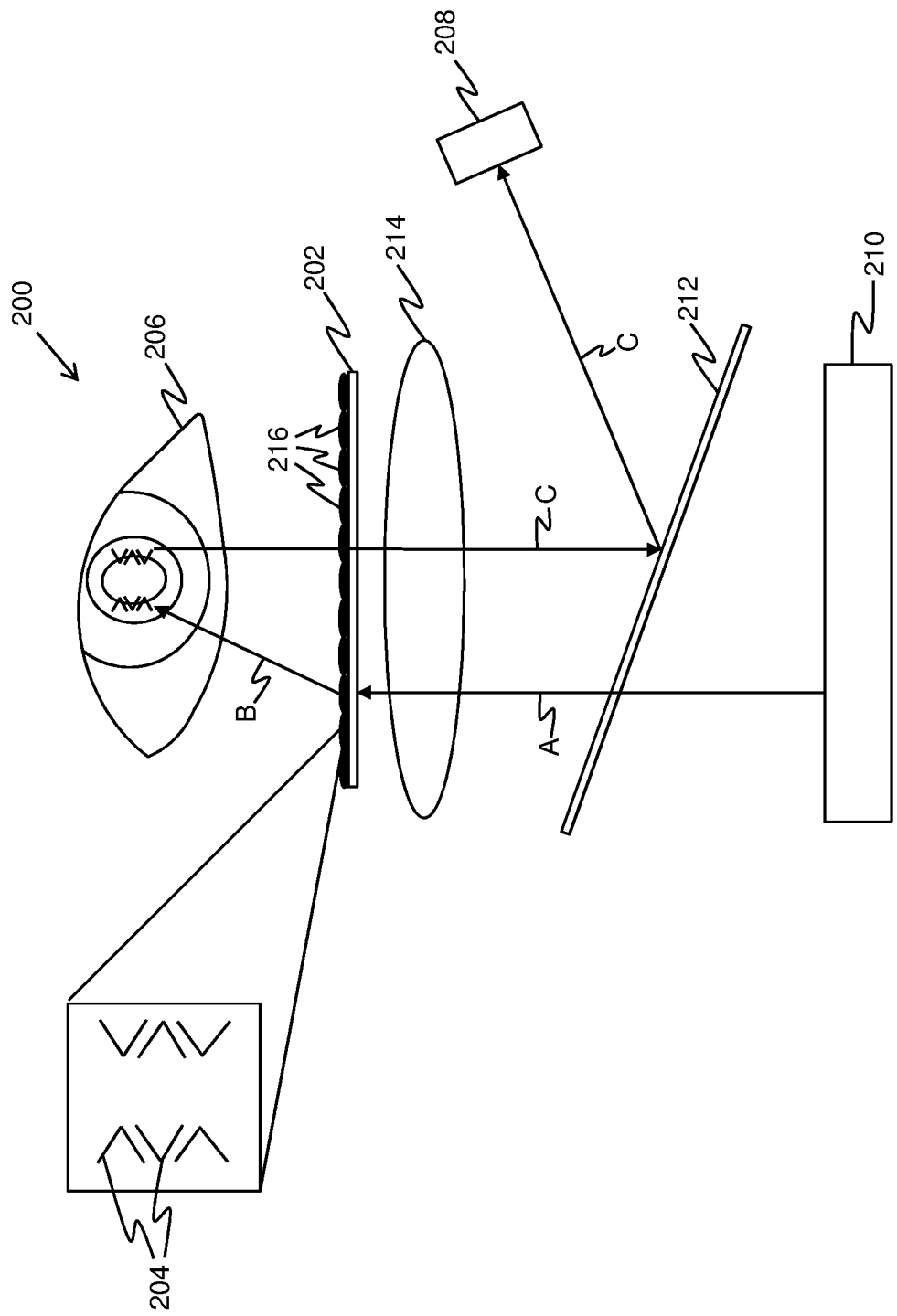

Referring to FIGS. 2A, 2B and 2C, illustrated are exemplary implementations of a gaze-tracking system 200 in use within a head-mounted display apparatus (not shown), in accordance with different embodiments of the present disclosure. It may be understood by a person skilled in the art that the FIGS. 2A, 2B and 2C include simplified arrangements for implementation of the gaze-tracking system 200 for sake of clarity, which should not unduly limit the scope of the claims herein. The person skilled in the art will recognize many variations, alternatives, and modifications of embodiments of the present disclosure.

As shown, the gaze-tracking system 200 comprises at least one first optical element, depicted as a first optical element 202, comprising particles 204 of a phosphorescent or fluorescent material dispersed therein. The particles 204 of the phosphorescent or fluorescent material are excited by electromagnetic radiation incident thereupon. Such electromagnetic radiation is depicted by ray A. When the electromagnetic radiation A is incident upon the particles 204, the particles 204 produce structured light of a given wavelength. As shown, the structured light is depicted by ray B. In operation, the produced structured light is used to illuminate a user's eye 206 when the head-mounted display apparatus is worn by the user. The gaze-tracking system 200 comprises at least one camera, depicted as camera 208, for capturing an image of reflections of the structured light B from the user's eye 206. Notably, the reflection of the structured light B is depicted by ray C. The gaze-tracking system 200 also comprises a processor (not shown) coupled in communication with the at least one camera 208, wherein the processor is configured to process the captured image to detect a gaze direction of the user.

In FIGS. 2B and 2C, the gaze-tracking system 200 is shown to optionally include at least one image renderer, depicted as an image renderer 210, for rendering an input image. As shown, a projection of the rendered input image emanating from the at least one image renderer 210 constitutes the electromagnetic radiation A. Furthermore, the gaze-tracking system 200 is shown to optionally include at least one second optical element, depicted as a second optical element 212, that is substantially transparent for visible light, but is substantially reflective for infrared light. Moreover, as shown, the gaze-tracking system 200 comprises an exit optical element 214 that is optionally positioned on an optical path of the electromagnetic radiation A and the reflections of the structured light C. Notably, the structured light is reflected from the user's eye 206 towards the at least one second optical element 212. The at least one second optical element 212 directs (namely, reflects) the reflections of the structured light C towards the at least one camera 208.

Additionally, in FIG. 2C, the at least one first optical element 202 comprises a plurality of microlenses, depicted as microlenses 216, for directing light intensity of the structured light.

Figure 3:
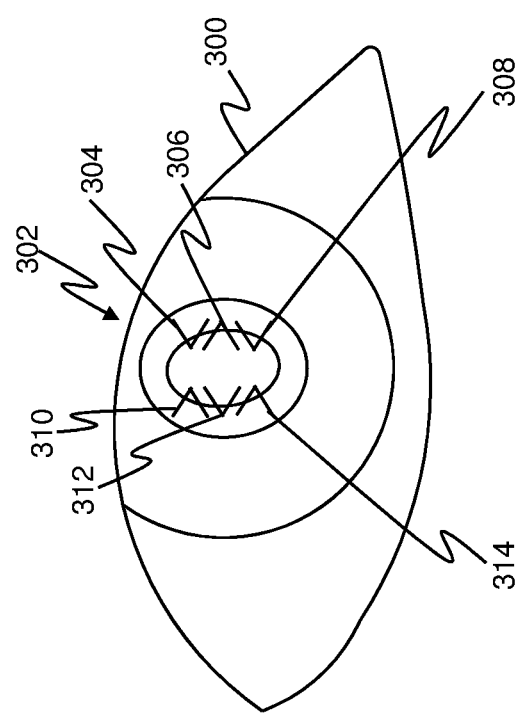
FIG. 3 illustrates an exemplary image of a user's eye captured by at least one camera of a gaze-tracking system, in accordance with an embodiment of the present disclosure.

Referring to FIG. 3, illustrated is an exemplary image of a user's eye 300 captured by at least one camera of a gaze-tracking system, in accordance with an embodiment of the present disclosure. As shown, reflections of the structured light, represented in the captured image, appear as a plurality of glints 302 positioned within a substantially circular region of a surface of the user's eye 300. The plurality of glints 302 are arranged into at least two columns, each of the plurality of glints 302 being symmetrical about only one axis. As shown, the plurality of glints 302 are optionally in a form of six characters, depicted as characters 304, 306, 308, 310, 312 and 314 that are arranged into two columns of three characters each, the characters being substantially V-shaped. Moreover, as shown, a middle character (for example, such as the middle characters 306 and 312) of a given column is optionally oriented differently from other characters of the given column.

Figure 4A:
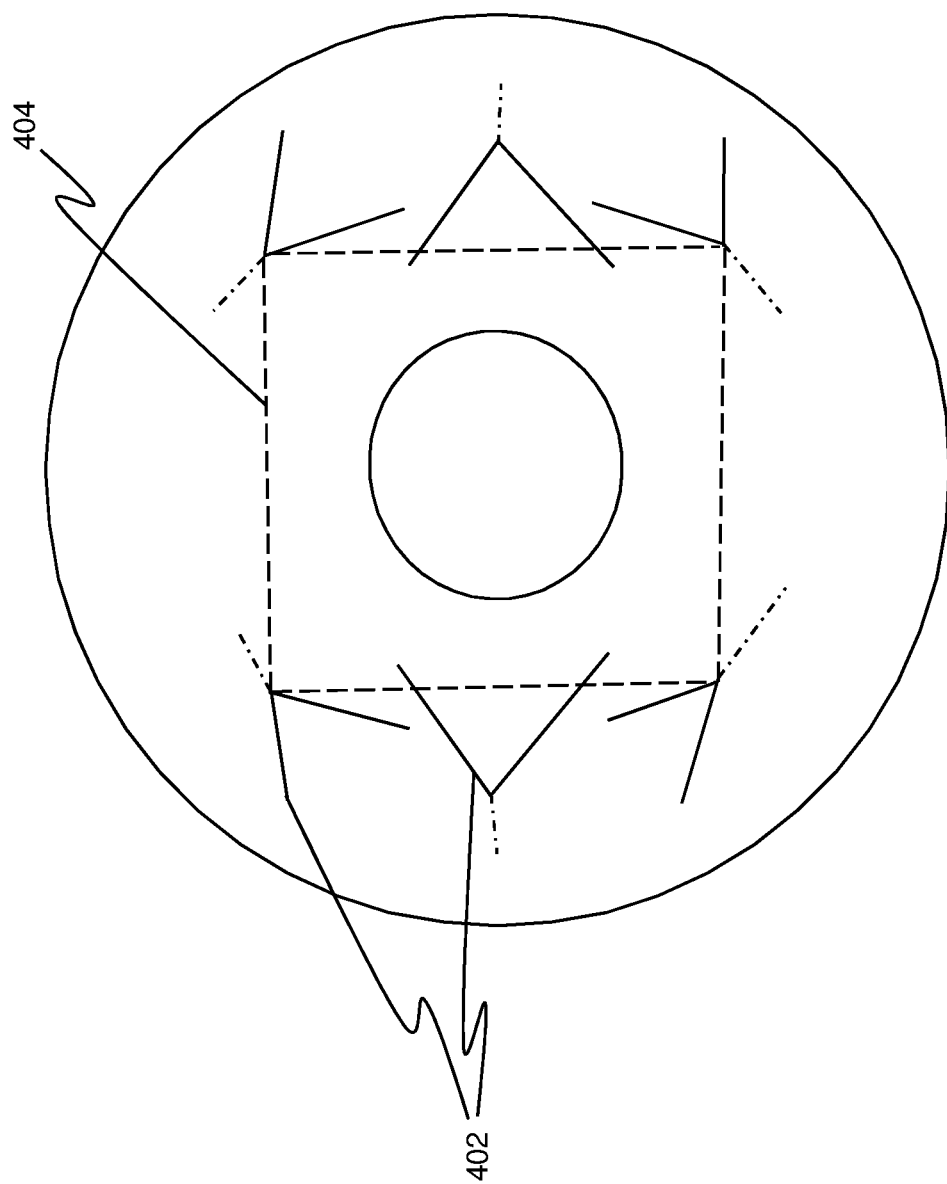
FIGS. 4A and 4B illustrate zoomed-in views of exemplary images of a user's eye depicting a plurality of glints therein, in accordance with different embodiments of the present disclosure.
Figure 4B:
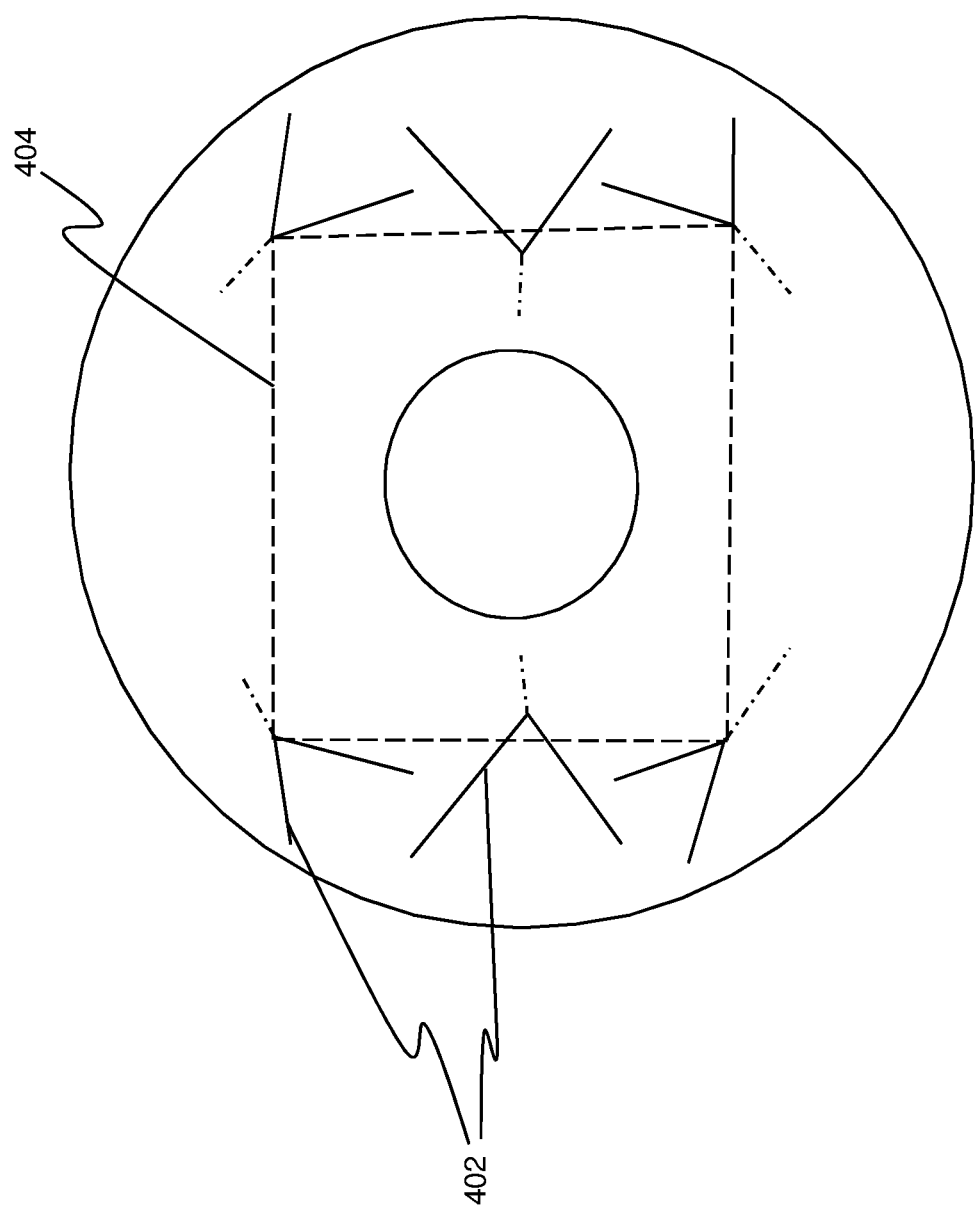

Referring to FIGS. 4A and 4B, illustrated are zoomed-in views of exemplary images of a user's eye depicting a plurality of glints 402 therein, in accordance with different embodiments of the present disclosure. As shown, the plurality of glints 402 define a polygon 404. A processor (not shown) of a gaze-tracking system is configured to determine a position of the user's pupil with respect to the polygon 404, so as to detect the gaze direction of the user. Furthermore, as shown, the plurality of glints 402 are in a form of six characters that are arranged into two columns of three characters each, the characters being substantially V-shaped.

In FIG. 4A, the middle characters of the given columns are oriented differently from other characters of the given columns whereas in FIG. 4B, the middle characters of the given columns are oriented substantially similarly to the other characters of the given columns.

Figure 5:
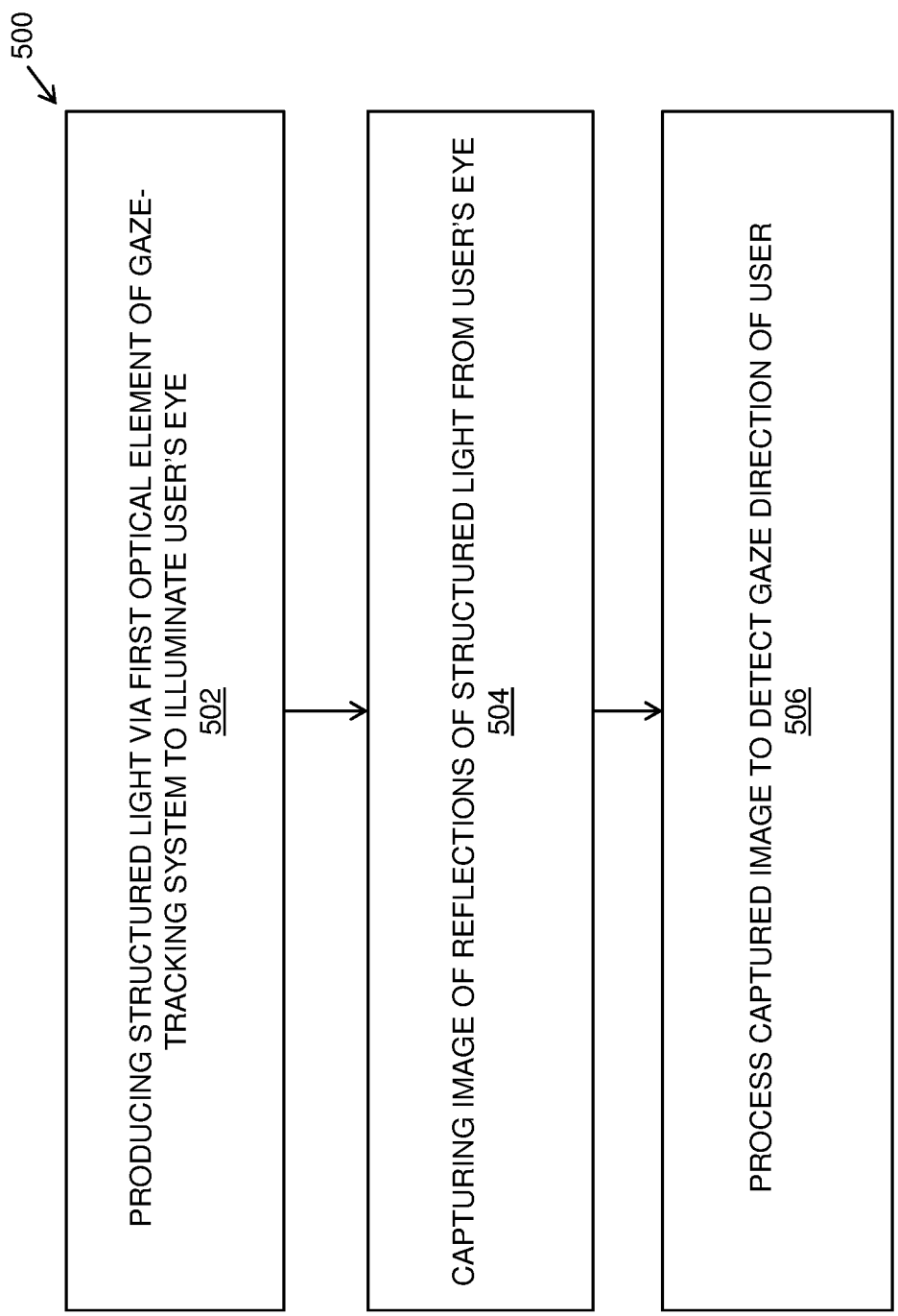
FIG. 5 illustrates steps of a method of tracking a user's gaze, via a gaze-tracking system of a head-mounted display apparatus, in accordance with an embodiment of the present disclosure.

Referring to FIG. 5, illustrated are steps of a method of tracking a user's gaze, via a gaze-tracking system of a head-mounted display apparatus, in accordance with an embodiment of the present disclosure. At step 502, a structured light is produced via at least one illuminator and at least one first optical element of the gaze-tracking system to illuminate a user's eye when the head-mounted display apparatus is worn by the user. The at least one first optical element comprises particles of a phosphorescent or fluorescent material dispersed therein, the particles of the phosphorescent or fluorescent material are dispersed in a manner that the particles produce the structured light of a given wavelength when excited by electromagnetic radiation incident thereupon. At step 504, an image of reflections of the structured light from the user's eye is captured via at least one camera of the gaze-tracking system. The image is representative of a form of the reflections and a position of the reflections on an image plane of the at least one camera. At step 506, the captured image is processed to detect a gaze direction of the user.

The steps 502 to 506 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A gaze-tracking system for use in a head-mounted display apparatus, the gaze-tracking system comprising:
    at least one first optical element comprising particles of a phosphorescent or fluorescent material dispersed therein, the particles of the phosphorescent or fluorescent material being dispersed in a manner that when excited by electromagnetic radiation incident thereupon, the particles produce structured light in a predefined pattern of a given wavelength, wherein the produced structured light is to be used to illuminate a user's eye when the head-mounted display apparatus is worn by the user;
    at least one source of the electromagnetic radiation positioned separate from the at least one first optical element when installed in the head-mounted display;
    at least one camera for capturing an image of reflections of the structured light from the user's eye, wherein the image is representative of a form of the reflections and a position of the reflections on an image plane of the at least one camera; and a processor coupled in communication with the at least one camera, wherein the processor is configured to process the captured image to detect a gaze direction of the user, wherein the reflections of the structured light, represented in the captured image, appear as a plurality of glints positioned within a circular region of a surface of the user's eye, the plurality of glints being arranged into at least two columns, each of the plurality of glints being symmetrical about only one axis, and wherein the plurality of glints are in a form of six characters that are arranged into two columns of three characters each, the characters being V-shaped.

2. The gaze-tracking system of claim 1, wherein the at least one first optical element further comprises a plurality of microlenses for directing light intensity of the structured light.

3. The gaze-tracking system of claim 1, wherein the head-mounted display apparatus comprises at least one image renderer for rendering an input image, and wherein the particles of the phosphorescent or fluorescent material are to be excited by the electromagnetic radiation produced by the at least one image renderer, so as to produce the structured light of the given wavelength.

4. The gaze-tracking system of claim 1, wherein a middle character of a given column is to be oriented differently from other characters of the given column.

5. The gaze-tracking system of claim 1, wherein, when processing the captured image, the processor is configured to identify a polygon defined by the plurality of glints, and to determine a position of the user's pupil with respect to the polygon, so as to detect the gaze direction of the user.

6. The gaze-tracking system of claim 1, the given wavelength is an infrared wavelength or a near-infrared wavelength.

7. The gaze-tracking system of claim 1, further comprising at least one second optical element that is transparent for visible light, but is reflective for infrared light.

8. The gaze-tracking system of claim 7, wherein the head-mounted display apparatus comprises at least one image renderer for rendering an input image, the at least one second optical element being positioned on an optical path of a projection of the rendered input image and on an optical path of the reflections of the structured light.

9. The gaze-tracking system of claim 1, further comprising at least one illuminator for emitting light pulses to illuminate the user's eye for enabling detection of a position of a pupil of the user's eye.

10. A method of tracking a user's gaze, via a gaze-tracking system of a head-mounted display apparatus, the method comprising:

producing structured light, via at least one first optical element of the gaze-tracking system, to illuminate a user's eye when the head-mounted display apparatus is worn by the user, the at least one first optical element comprising particles of a phosphorescent or fluorescent material dispersed therein, the particles of the phosphorescent or fluorescent material being dispersed in a manner that when excited by electromagnetic radiation incident thereupon, the particles produce the structured light in a predefined pattern of a given wavelength;

positioning at least one source of the electromagnetic radiation separate from the at least one first optical element when installed in the head-mounted display;

capturing an image of reflections of the structured light from the user's eye, via at least one camera of the gaze-tracking system, wherein the image is representative of a form of the reflections and a position of the reflections on an image plane of the at least one camera; and processing the captured image to detect a gaze direction of the user, wherein the reflections of the structured light, represented in the captured image, appear as a plurality of glints positioned within a circular region of a surface of the user's eye, the plurality of glints being arranged into at least two columns, each of the pluralilty of glints being symmetrical about only one axis, and wherein the plurality of glints are in a form of six characters that are arranged into two columns of three characters each, the characters being V-shaped.

11. The method of claim 10, wherein the at least one first optical element further comprises a plurality of microlenses for directing light intensity of the structured light.

12. The method of claim 10, wherein a middle character of a given column is oriented differently from other characters of the given column.

13. The method of claim 10, wherein the processing of the captured image comprises:

identifying a polygon defined by the plurality of glints; and determining a position of the user's pupil with respect to the polygon, so as to detect the gaze direction of the user.

14. The method of claim 10, the given wavelength is an infrared wavelength or a near-infrared wavelength.

15. The method of claim 10, further comprising emitting light pulses, via at least one illuminator of the gaze-tracking system, to illuminate the user's eye for enabling detection of a position of a pupil of the user's eye.

* * * * *